(No Model.)

G. A. MAUERMANN.
PNEUMATIC COTTON PICKER.

No. 498,133. Patented May 23, 1893.

WITNESSES:
Paul Johst
E. M. Clark

INVENTOR
G. A. Mauermann
BY
Munn & Co
ATTORNEYS.

UNITED STATES PATENT OFFICE.

GUSTAV A. MAUERMANN, OF SAN ANTONIO, TEXAS.

PNEUMATIC COTTON-PICKER.

SPECIFICATION forming part of Letters Patent No. 498,133, dated May 23, 1893.

Application filed August 16, 1892. Serial No. 443,202. (No model.)

*To all whom it may concern:*

Be it known that I, GUSTAV A. MAUERMANN, of San Antonio, in the county of Bexar and State of Texas, have invented a new and Improved Pneumatic Cotton-Picker, of which the following is a full, clear, and exact description.

My invention relates to improvements in pneumatic cotton pickers, and the object of my invention is to produce a simple machine having a cotton receiving box or vacuum box and arranged to use both a blast and suction pipe, these pipes being oppositely arranged and the suction pipe being made to deliver into the cotton box. By this arrangement the cotton may be blown and sucked from the plants and delivered into the cotton box.

A further object of my invention is to produce a suitable guide which will cause all the plants in the path of the machine to pass the mouths of the air pipes, thus bringing their bolls in position to be picked.

To these ends my invention consists in certain features of construction and combinations of parts, which will be hereinafter described and claimed.

Reference is to be had to the accompanying drawings forming a part of this specification, in which similar figures of reference indicate corresponding parts in all the views.

Figure 1:
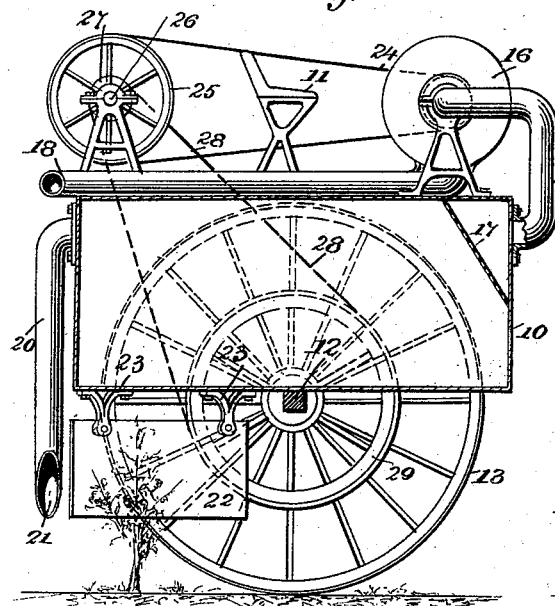
Figure 2:
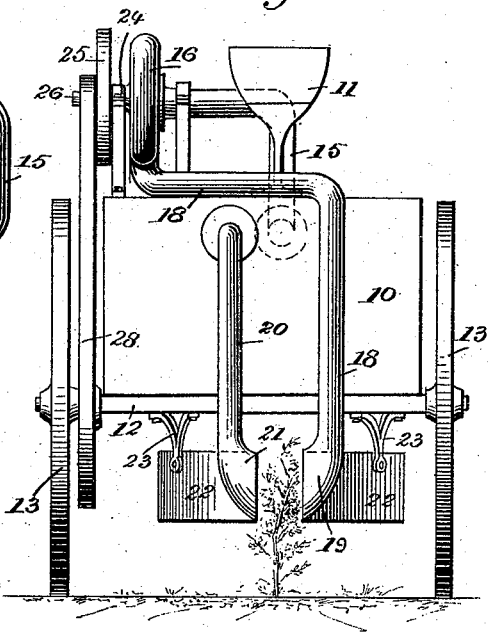
Figure 3:
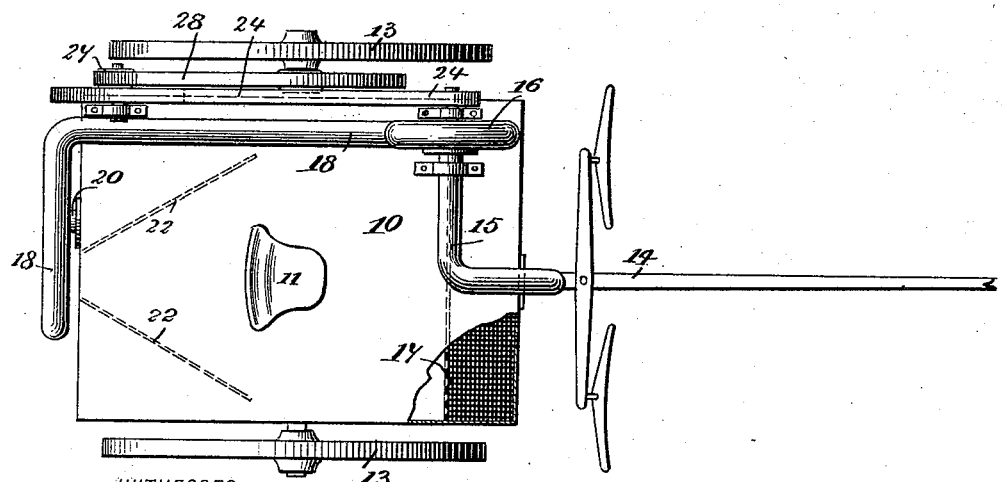

Figure 1 is a central longitudinal section of the machine embodying my invention. Fig. 2 is a rear elevation of the same; and Fig. 3 is a broken plan view of the machine.

The body portion of the machine consists of a vacuum or cotton box 10 which is adapted to receive the picked cotton. This box carries a seat 11 and is mounted on a supporting axle 12 which is journaled in wheels 13 and to which is secured an ordinary drawing pole or tongue 14. It will be noted, however, that the cotton box may be secured to any suitable running gear. Opening from the front end of the box, near the top, is an exhaust pipe 15 which connects with an exhaust fan or blower 16, and the mouth of the pipe 15 is protected by a screen 17 which extends across the upper front corner of the box 10 so as to prevent the picked cotton from being drawn into the blower.

Leading from the blower 16 is a blast pipe 18 which extends rearward over the top of the box 10 and then drops down behind the box, as best shown in Fig. 2, the lower end of the pipe terminating at a point about as high as the average cotton plant. The lower end of the pipe 18 is bent slightly so that the mouth 19 shall assume a vertical position and be at right angles to the axle of the vehicle. Directly opposite the vertical portion of the pipe 18 is a suction pipe 20 which enters the rear end of the box 10 and which at its lower end has a mouth 21, exactly similar to the mouth 19 already described, and the mouth 21 is placed opposite the mouth 19 but sufficient distance is left between the two mouths for the passage of the cotton plants, as hereinafter described.

Immediately in front of the mouths 19 and 21 of the air blast and suction pipes are guide fenders 22 which converge rearwardly and which have their rear ends placed very close to the mouths 19 and 21. The fenders 22 are suspended by means of suitable hangers 23, but any suitable arrangement may be provided to support them.

The blower of the machine is driven by a belt 24 which connects with a pulley 25 and a counter shaft 26 supported at the rear end of the machine, and the counter shaft has a pulley 27 driven by a belt 28 running on a pulley 29 carried by one of the main wheels 13, so that the blower will be operated by the movement of the vehicle, but any suitable gearing may be employed to drive the blower.

When the machine is used it is drawn lengthwise over the rows of cotton plants, and the fenders 22 guide the plants between the mouths 19 and 21 of the air blast and suction pipes 18 and 20. The action of the blower it will be seen causes a partial vacuum to be created in the box 10 and a consequent suction in the pipe 20, but the air withdrawn from the box 10 is expelled through the pipe 18 and when the plant is brought between the two mouths 19 and 21 the bolls of cotton will be sucked into the mouth 21 and will also be thrown into said mouth by the air which rushes out from the pipe 18; the cotton will thus be cleanly and rapidly picked and the suction in the pipe 20 delivers it into the box 10. When the box is filled it is emptied and the operation repeated.

Having thus described my invention, I claim as new and desire to secure by Letters Patent—

1. The combination with the closed or imperforate box or receiver having a cotton inlet suction pipe, of a blower having its inlet communicating with the interior of said box or receiver to exhaust the air therefrom and create a suction through said cotton suction pipe and a blast pipe leading from the blower and having its outlet end facing the inlet end of said suction pipe, substantially as set forth.

2. A pneumatic cotton picker comprising the closed or imperforate box or receiver having a depending cotton inlet suction pipe having a lateral opening 21 at its lower end, a wheeled axle carrying the box, a blower mounted on the box and having its air supply or inlet communicating with the interior of the box or receiver to exhaust the air therefrom and create a suction through said suction pipe, a blast pipe leading from the blower and having its lateral outlet 19 opposite the opening 21 and spaced therefrom for the passage of the plants therebetween, fenders directing the plants between the openings 19, 21 and means for driving the blower, substantially as set forth.

GUSTAV A. MAUERMANN.

Witnesses:
C. F. KLEINE,
B. J. MAUERMANN.